(12) United States Patent
Didierjean

(10) Patent No.: US 11,002,358 B2
(45) Date of Patent: May 11, 2021

(54) METHOD FOR CONTROLLING THE DISPLACEMENT OF A PUMP FOR A HYDRAULIC ASSISTANCE

(71) Applicant: POCLAIN HYDRAULICS INDUSTRIE, Verberie (FR)

(72) Inventor: Claude Didierjean, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 16/628,895

(22) PCT Filed: Jul. 4, 2018

(86) PCT No.: PCT/FR2018/051672
§ 371 (c)(1),
(2) Date: Jan. 6, 2020

(87) PCT Pub. No.: WO2019/008277
PCT Pub. Date: Jan. 10, 2019

(65) Prior Publication Data
US 2020/0232556 A1    Jul. 23, 2020

(30) Foreign Application Priority Data

Jul. 7, 2017    (FR) ...................................... 1756424

(51) Int. Cl.
*F16H 61/46*    (2010.01)
*F16H 59/44*    (2006.01)
(52) U.S. Cl.
CPC .................................. *F16H 59/44* (2013.01)

(58) Field of Classification Search
CPC ........ F16H 59/44; F16H 61/46; F16H 61/431; B60K 17/354; B60K 17/356; B60K 23/0808; B60K 17/348; B60K 7/0015; B60K 23/08
See application file for complete search history.

(56) References Cited

U.S. PATENT DOCUMENTS

| 5,001,900 A | * | 3/1991 | Sasajima ............... F16H 61/421 477/68 |
| 6,367,572 B1 | | 4/2002 | Maletschek et al. |
| 10,350,994 B2 | | 7/2019 | Didierjean et al. |

(Continued)

FOREIGN PATENT DOCUMENTS

| EP | 0993982 A1 | 4/2000 |
| FR | 3026811 A1 | 4/2016 |

*Primary Examiner* — Justin Holmes
(74) *Attorney, Agent, or Firm* — The Webb Law Firm

(57) ABSTRACT

A method for controlling a transmission device of a vehicle. The device includes a hydraulic transmission. The displacement of the hydraulic pump is controlled so that it delivers to the n hydraulic motors a constant flow that is proportional to the speed of the wheels rotated by the drive. The displacement control of the hydraulic pump is carried out by a correction constant and a correction variable. The correction variable is determined in real time. The correction constant includes the sum of a theoretical constant and an adjusted constant. The theoretical constant is defined according to the theoretical behaviour of the hydraulic transmission. The adjusted constant is defined and corrected when the vehicle is in predetermined conditions of use, in order to reflect the real state of the vehicle.

8 Claims, 3 Drawing Sheets

(56) References Cited

U.S. PATENT DOCUMENTS

| | | |
|---|---|---|
| 2007/0101709 A1 | 5/2007 | Cronin |
| 2014/0100079 A1 | 4/2014 | Schubert |
| 2014/0244117 A1 | 8/2014 | Wu et al. |
| 2015/0033718 A1* | 2/2015 | Kaneko .................. F16H 61/47 60/327 |
| 2017/0067489 A1* | 3/2017 | Versteyhe ........... F16H 61/4096 |

* cited by examiner

METHOD FOR CONTROLLING THE DISPLACEMENT OF A PUMP FOR A HYDRAULIC ASSISTANCE

CROSS-REFERENCE TO RELATED APPLICATIONS

This application is the United States national phase of International Application No. PCT/FR2018/051672 filed Jul. 4, 2018, and claims priority to French Patent Application No. 1756424 filed Jul. 7, 2017, the disclosures of which are hereby incorporated by reference in their entirety.

FIELD OF THE INVENTION

The present disclosure relates to variable displacement hydraulic machines and more specifically to the piloting of the displacement of such a hydraulic machine.

STATE OF THE PRIOR ART

The advantage of a hydraulic transmission which allows delivering a high torque at moderate speeds is known.

The hydraulic transmission can be the main transmission of the vehicle or be an assistance transmission, associated with a main mechanical transmission. For example, European Patent EP 0 993 982 discloses the combined use of a hydraulic transmission and a mechanical transmission. In this case, the hydraulic transmission is used under particular conditions, particularly to provide an assistance of the mechanical transmission under traveling conditions that require it, for example in case of loss of adhesion of at least one of the wheels of the vehicle when it travels on slippery ground such as a construction site.

Whether it is the main transmission or an assistance transmission, the hydraulic transmission can be used under difficult traveling conditions. In some cases, it must be used at very low speed, for example when the vehicle is traveling on a particularly slippery or uneven ground, in particular to cross over an obstacle such as a speed bump or curb, or to get over a rut, in particular in the mud. In such a situation, the hydraulic transmission must deliver a significant torque and drive the wheels at very low speed but sufficient enough to allow the vehicle to circulate and, where necessary, to get past the obstacle.

The output speed of hydraulic motors is a function of the flow rate of the pump, that is to say, a function of the product of the driving speed of the pump by its displacement. For example, a continuously variable displacement pump is used, and it is therefore by varying this displacement that the discharge flow rate of the pump is varied. When the hydraulic transmission is an assistance transmission, the driving of the pump may be the drive motor of the mechanical transmission.

Thus, in principle, knowing the displacement of the motors, the output speed of these is set to a target value by setting the flow rate of the pump to a target value which, at a given driving speed of the pump, is equivalent to setting the displacement of the pump to a target displacement. This is for example what is conventionally done for a hydraulic assistance transmission, when it comes to provide by this assistance an assistance torque of the mechanical transmission and thus, to ensure that the output speed of the hydraulic motors coupled to the wheels of the vehicle is consistent with the speed given by the mechanical transmission (it may be equal to this speed or, on the contrary, be slightly greater or slightly lower, depending on whether it is desired to obtain a positive assistance or a restricting effect).

However, it has been found that assistance transmissions commonly have variable performances, in particular depending on the conditions of use and on the characteristics of the associated vehicle. Thus, situations are frequently observed in which the hydraulic assistance has a degraded and/or delayed effect. More specifically, the hydraulic pump supplying the assistance is piloted so as to deliver a flow rate equal to a target value to which an offset is added. However, this offset must take into account the particularities of the hydraulic system and the configuration of the vehicle equipped with the hydraulic system, which may be different from those of another vehicle, and may therefore be relatively significant. In other words, the offset determined for a good operation of a vehicle may be unsuitable for another vehicle of the same type, or the offset determined for a new vehicle may be unsuitable after a certain time of operation, by wear of the components or of the tires, or work under a different load, or variations in the set of tires or different wheels. Under certain conditions of use, in particular in case of wheel slip, such an offset may lead to a delay in operating the assistance, and also to an insufficient displacement of the hydraulic pump to ensure the assistance.

The present disclosure aims to at least partially address these issues.

SUMMARY OF THE INVENTION

For this purpose, the present disclosure relates to a method for controlling a transmission device of a vehicle, the device comprising a hydraulic transmission having n hydraulic motors driving the carrying wheels of the vehicle, n being a non-zero integer, and a hydraulic pump able to be driven by a drive to supply the hydraulic motors with fluid, wherein the displacement of the hydraulic pump is piloted so that it delivers a constant flow rate to the n hydraulic motors that is proportional to the speed of main wheels driven in rotation by the drive, characterized in that the displacement piloting of the hydraulic pump is carried out by means of a correction constant and a correction variable, the correction variable being determined in real time, the correction constant being composed of the sum of a theoretical constant and an adjusted constant, the theoretical constant being defined as a function of the theoretical behavior of the hydraulic transmission, and the adjusted constant being defined and corrected when the vehicle is under predetermined conditions of use, in order to reflect the real state of the vehicle.

According to one example, said adjusted constant is stored in a memory unit, and reevaluated upon execution of an evaluation command.

According to one particular embodiment of such an example, said evaluation command is performed each time the vehicle is put into operation.

Alternatively, during the evaluation command, the value of the adjusted constant is changed to be equal to a percentage of the value of the correction variable, said percentage being comprised between 80 and 95%.

According to one example, the adjusted constant reflects in particular the rolling circumference of each axle of the vehicle driven by one of said hydraulic motors, the variations in efficiency of the different components of the hydraulic transmission and mechanical elements of the vehicle.

According to one example, the correction variable is less than or equal to a threshold value. It is then possible to typically emit an error signal when the correction variable has a value greater than or equal to said threshold value or more generally when the absolute value of the correction variable exceeds a threshold value.

The present disclosure also relates to a vehicle comprising a transmission device configured to be controlled according to the method as defined above.

BRIEF DESCRIPTION OF THE DRAWINGS

The invention and its advantages will be better understood upon reading the detailed description given below of various embodiments of the invention given as non-limiting examples. This description refers to the pages of appended figures, in which.

In all the figures, the elements in common are identified by identical reference numerals.

DETAILED DESCRIPTION OF EXEMPLARY EMBODIMENTS

Figure 1:
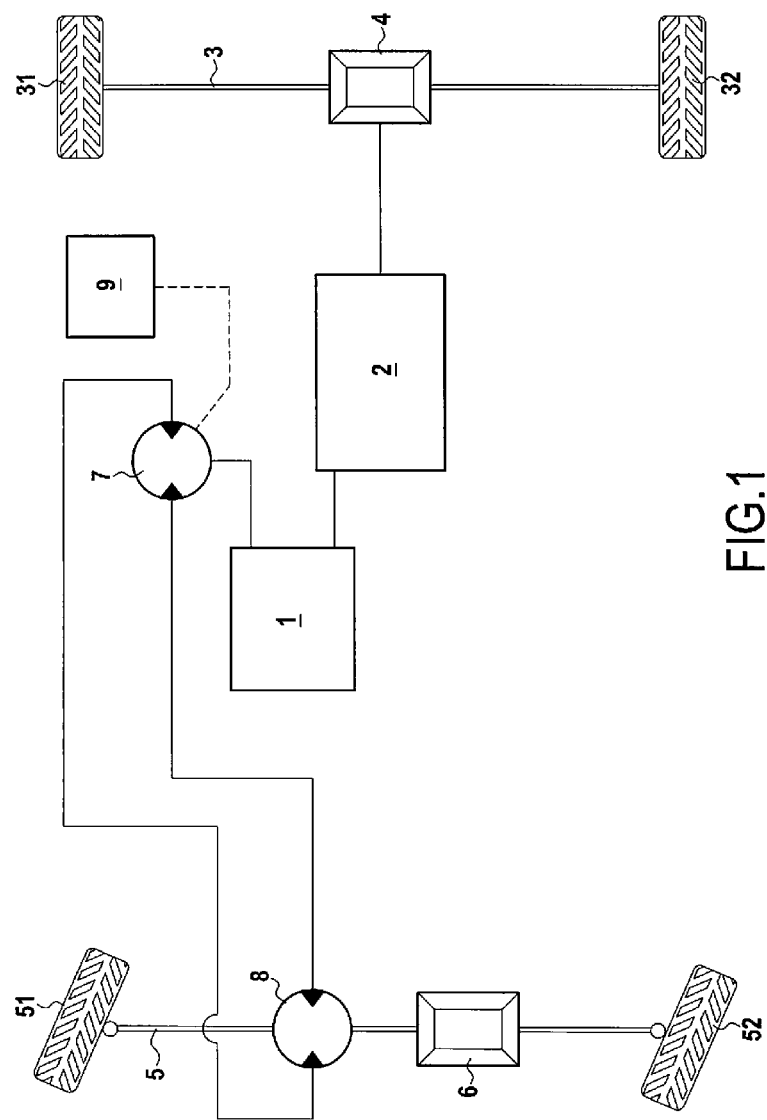
FIG. 1 schematically represents a vehicle provided with a hydraulic assistance on an axle, FIGS. 2A, 2B, 2C and 2D schematize the operation of a hydraulic assistance piloted via a conventional piloting method, and FIGS. 3A, 3B, 3C and 3D schematize the operation of a hydraulic assistance piloted via a piloting method according to the invention.
Figure 2A:
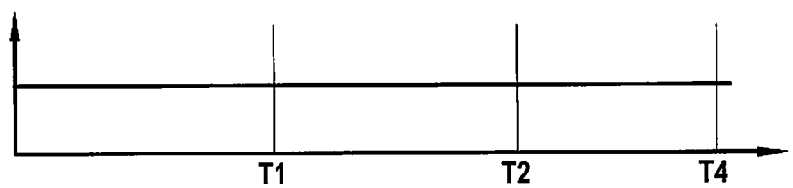
Figure 2B:
Figure 2C:
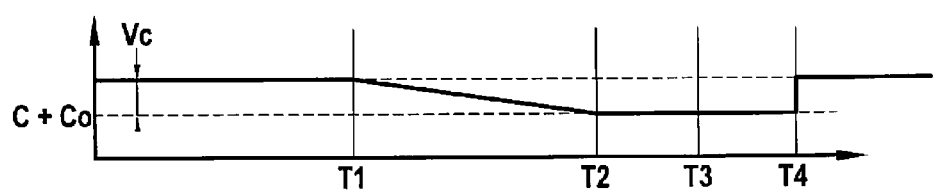
Figure 2D:
Figure 3A:
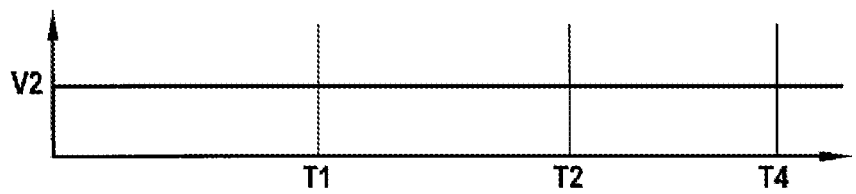
Figure 3B:
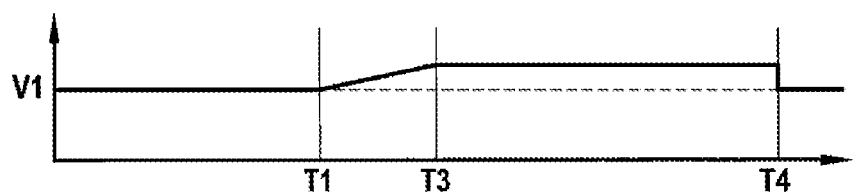
Figure 3C:
Figure 3D:
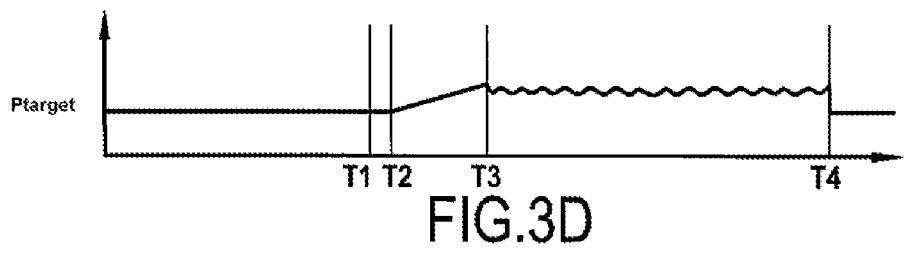

FIG. 1 schematically represents a vehicle provided with a hydraulic assistance on an axle.

This figure represents an engine 1 forming a drive for a first axle 3 provided with wheels 31 and 32, here represented equipped with a first differential 4. The engine 1 is typically a heat engine, connected to the differential 4 via a gearbox 2. The axle 3 is thus typically the axle referred to as "main" axle for the vehicle. More generally, the wheels 31 and 32 are main or usual drive wheels of the vehicle.

The vehicle is also equipped with an assistance transmission on a second axle 5 provided with a second differential 6 and two wheels 51 and 52, which are here represented as being steered wheels (it will be understood that this embodiment is given by way of example, and that the steered or non-steered nature of the wheels of the axle driven by the hydraulic assistance transmission has no impact on the invention). More generally, the wheels 51 and 52 are standard carrying wheels of the vehicle.

The assistance transmission is here schematically represented as comprising a hydraulic pump 7 and a hydraulic motor 8.

A completely equivalent transmission can be provided by associating a hydraulic motor with each wheel 51, 52, the differential 6 being then able to be removed insofar as the wheels 51 and 52 are then not linked in rotation, thereby giving a differential effect. In this case, the motors associated with the two wheels 51 and 52 are hydraulically connected in parallel with the inlet and the discharge of the pump 7.

Whether it is the mounting with differential or the mounting without differential, the motor 8 can rotate at wheel speed, or a step-up or step-down ratio can exist between the motor 8 and the wheels 51, 52.

The hydraulic pump 7 is coupled to the engine 1 which thus allows ensuring the drive. The hydraulic pump 7 thus delivers a flow rate to the hydraulic motor 8, so as the latter applies a motor torque on the second axle 5.

The hydraulic motor 8 is typically a radial-piston and fixed-displacement hydraulic apparatus. The hydraulic pump 7 is typically an axial-piston and variable-displacement hydraulic apparatus, which can alternate between a freewheel configuration in which they have zero displacement (for example by retraction of pistons in their respective housings, or by disengagement of the cylinder block for radial-piston machines, or by zero displacement positioning of the table of an axial-piston machine), and a service configuration (in which the displacement is non-zero). It will be understood that the operation remains unchanged in a configuration where the hydraulic pump 7 drives several hydraulic motors. More generally, the present disclosure applies for a hydraulic pump 7 associated with n hydraulic motors, with n being a non-zero integer.

In operation, it is the engine 1 that ensures the "main" driving of the vehicle. The assistance transmission is typically engaged under particular conditions, for example in case of loss of adhesion or for crossing over obstacles.

When the assistance transmission is put into operation, a controller 9 pilots the displacement of the hydraulic pump 7 so as it delivers a flow rate as a function of the rotational speed of the first axle 3. This flow rate is typically calculated so as the rotational speed of the wheels of the second axle 5 is equal to or substantially greater than the rotational speed of the wheels of the first axle 3, so as to provide assistance to the movement, and not to slow down the movement of the vehicle.

The displacement of the hydraulic pump 7 is thus determined to be equal to a target, typically fixed, value for each gearbox 2 ratio engaged. More specifically, as a function of the speed of the main wheels 31 and 32 of the first axle 31 of the vehicle (or the value of a parameter related thereto), and of the rotational speed of the hydraulic pump 7 (or the value of a parameter related thereto, for example the rotational speed of the engine 1), the theoretical displacement value corresponding to the desired flow rate is determined in order to drive the carrying wheels 51 and 52 to the desired rotational speed. Considering a vehicle traveling under predetermined and constant conditions, the thus determined displacement value is therefore constant. It is however understood that in operation under real conditions, the target pressure and displacement value will change as a function of time, as a function of the rotational speed of the wheels of the main axle 3 driven by the engine 1 (or a parameter related thereto).

The controller 9 determines a command to change the displacement of the hydraulic pump 7. This command takes into account several components: a theoretical value C based on the rotational speed of the wheels of the first axle 3, a correction constant and a correction variable.

The correction variable Vc aims at compensating at any time for an excess or a defect in displacement of the hydraulic pump 7.

The correction constant Cc reflects the state of the assistance system, as detailed hereinafter.

The correction constant integrates two components; a theoretical constant Ct and an adjusted constant Ca.

The displacement of the hydraulic pump 7 is thus equal to C+Vc+Cc, with Cc=Ca+Ct.

The theoretical constant Ct is determined as a function of the theoretical behavior of the hydraulic assistance, in particular as a function of the theoretical head losses in the associated hydraulic circuit.

The adjusted constant Ca is for its part evaluated and re-evaluated under given conditions of use. It reflects the real state of the vehicle as a whole, and thus allows to take into account parameters that cannot be determined accurately in a theoretical manner such as the state of the tires, the wear of the components, the leakages, the rolling circumference of each axle of the vehicle driven by a hydraulic motor 8, the variations in efficiency of the various components of the hydraulic transmission and mechanical elements of the vehicle. The rolling circumference may indeed vary over time on an axle depending on the load of the vehicle or on the inflation of the tires.

The adjusted constant Ca is typically corrected each time the vehicle is put into operation, or upon execution of an evaluation command.

More specifically, the adjusted constant Ca is evaluated as a function in particular of the correction variable Vc, so as to minimize the latter.

When the vehicle is put into operation the first time, the adjusted constant Ca is typically zero. The displacement of the hydraulic pump 7 is thus equal to C+Vc+Cc, namely C+Vc+Ca+Ct, with Ca=0.

An evaluation command is then executed, typically by the controller 9, for example when the vehicle is started or when the hydraulic assistance is put into operation, or when the vehicle is under predetermined conditions, which can in particular include the following conditions: the hydraulic assistance is activated, the hydraulic pump 7 delivers a flow rate allowing to obtain a predetermined target pressure, the vehicle is not under a slip condition, the vehicle typically travels at a predetermined speed or a speed comprised in a predetermined range of values, has an acceleration smaller than or equal to a threshold value, and travels in a straight line.

The evaluation command will then define the adjusted constant Ca, for example by assigning to it the value of the correction variable Vc at a given moment (or an average value of the correction variable Vc over a predetermined duration), or a value that is proportional to the value of the correction variable Vc, for example 0.8 Vc, 0.9 Vc, or 0.95 Vc.

Once the adjusted constant Ca is thus changed, it is understood that the correction variable Vc then decreases greatly, insofar as the correction constant Cc comprising the adjusted constant Ca allows obtaining a displacement very close to the desired displacement. This value of Ca is representative of the displacement necessary to adjust the speed of the carrier axle (that is to say the axle 5 in the example illustrated in FIG. 1) with respect to the drive axle (i.e. the axle 3 in the example illustrated in FIG. 1) in the instantaneous configuration of the vehicle.

The value of the adjusted constant Ca can then be re-evaluated and, where appropriate, changed, for example, under the aforementioned conditions.

Advantageously, the value of the adjusted constant Ca is stored in non-volatile memory, for example integrated to the controller 6, so as it can be taken into account during a subsequent starting of the hydraulic assistance and/or of the vehicle, instead of restarting with a zero value Ca.

According to one example, the value of the correction variable Vc is limited, which allows limiting the amplitude of the displacement variation of the hydraulic pump 7.

FIGS. 2A to 2D and 3A to 3D represent graphs highlighting the operation and the effect of the invention compared to a conventional piloting method.

FIGS. 2A to 2D present several graphs illustrating the operation of a hydraulic assistance piloted via a conventional piloting method, while FIGS. 3A to 3D present several graphs illustrating the operation of a hydraulic assistance piloted via a piloting method according to the invention.

Firstly, the operation of a hydraulic assistance piloted via a conventional piloting method is described with reference to FIGS. 2A to 2D, in which:
- 2A, which represents the speed of the wheels of the second axle 5 (i.e. the speed of the wheels of an axle driven by a hydraulic assistance),
- 2B, which represents the speed of the wheels of the first axle 3 (i.e. the speed of the wheels of an axle driven by a main driving of a vehicle),
- 2C, which represents the displacement of the hydraulic pump 7, and
- 2D, which represents the pressure delivered by the hydraulic pump 7, thus supplying the hydraulic motor 8.

An example in which the vehicle travels at constant speed is here considered. It is driven by its main motor, typically the heat engine 1 if the vehicle schematically represented in FIG. 1 is considered.

The various steps are described hereinafter.

Between T0 and T1

The wheels of the first axle 3 driven by the heat engine 1 initially move at constant speed V1, as represented in the graph 2B between T0 and T1. The wheels of the second axle 5 associated with the hydraulic assistance also move at constant speed V2 (graph 2A). The hydraulic pump is piloted to deliver a constant pressure Ptarget (graph 2D), and is therefore piloted so as to have a displacement (graph 2C) equal to a theoretical displacement C to which are added a correction constant Co and a correction variable (or "offset") Vc. The pressure Ptarget is determined to give a neutral behavior to the assistance, that is to say, not to provide a significant tractive force.

Between T1 and T2

At moment T1, the first axle 3 enters in slip condition. As can be seen in the graph 2B, the rotational speed of the wheels under slip condition therefore increases rapidly. Such a situation causes a decrease in the motor torque on the first axle 3. It is therefore the hydraulic assistance associated with the second axle 5 that must compensate for this torque loss. The hydraulic pump 7 here seeks to maintain a constant pressure Ptarget with a view to maintaining sufficient torque on the second axle 5 (graph 2D). In order to maintain this constant pressure Ptarget, the displacement of the pump will gradually decrease until reaching the theoretical displacement C+Co. The offset Vc is thus "consumed" in order to maintain a constant output pressure of the hydraulic pump 7. During this period of consumption of the offset Vc, the hydraulic assistance then has no effect on the second axle 5.

Between T2 and T3

The wheels of the first axle 3 are still under slip condition, and the rotational speed continues to increase (graph 2B). At moment T2, the displacement of the pump reaches the theoretical value C (graph 2C). The offset Vc is then completely consumed. The output pressure of the hydraulic pump 7 then increases (graph 2D) until reaching a threshold value at a moment T3.

Between T3 and T4

When the output pressure of the hydraulic pump 7 reaches the threshold value at a moment T3, the hydraulic assistance becomes effective, and then exerts a torque on the second axle 5 ensuring a driving of the vehicle, so as to control the rotational speed of the wheels of the first axle 3 (graph 2B). However, this hydraulic assistance is then provided with a reduced displacement (graph 2C); the hydraulic assistance is thus not provided in an optimal manner.

From T4

At moment T4, the slip stops. The wheels of the first axle 3 recover their initial rotational speed (graph 2B), and the output pressure of the hydraulic pump 7 also returns to its initial value Ptarget (graph 2D). The displacement of the hydraulic pump 7 is changed to return to its initial value.

The operation of a piloted hydraulic assistance by means of a method according to the invention is now described with reference to FIGS. 3A to 3D.

Just like FIGS. 2A to 2D, FIGS. 3A to 3D are in several graphs;
- 3A, which represents the speed of the wheels of the second axle 5 (i.e. the speed of the wheels of an axle driven by a hydraulic assistance),
- 3B, which represents the speed of the wheels of the first axle 3 (i.e. the speed of the wheels of an axle driven by a main driving of a vehicle),
- 3C, which represents the displacement of the hydraulic pump 7, and
- 3D, which represents the pressure delivered by the hydraulic pump 7, thus supplying the hydraulic motor 8.

Between T0 and T1

The wheels of the first axle 3 driven by the heat engine 1 move initially at a constant speed V1, as represented in the graph 3B between T0 and T1. The wheels of the second axle 5 associated with the hydraulic assistance also move at constant speed V2 (graph 3A). The hydraulic pump is piloted to deliver a constant pressure Ptarget (graph 3D), and is therefore piloted so as to have a relatively constant displacement (graph 3C).

The displacement of the hydraulic pump 7 is initially equal to C+Cc+Vc, with C being the theoretical displacement value, Cc the correction constant and Vc the correction variable as already described above, the adjustment of the displacement being performed within the limits of the predetermined correction variable Vc.

At a moment Te, a command for evaluating the displacement of the hydraulic pump 7 is performed. As previously described, the correction constant is then adjusted as a function of the correction variable, in order to minimize the latter. Indeed, the correction constant integrates two components; a theoretical constant Ct and an adjusted constant Ca. The theoretical constant Ct remains unchanged, while the adjusted constant is changed, for example to correspond to 0.9 or 0.95 Vc during the execution of the evaluation command. The correction constant thus takes a new value Cc', whereas the correction variable Vc is greatly reduced (it is then indicated by Vc'), and then has a value that can thus be equal to 10% or 5% of its value preceding the evaluation command. It is here understood that it is possible to execute several evaluation commands successively in order to refine the value of the adjusted constant Ca and therefore of the correction constant Cc, the operation then remaining unchanged.

In the example represented, the correction variable Vc is represented as having a positive value. However, it is understood that this correction variable Vc can have a positive or negative value, that is to say, represent a rolling radius too large or too small compared to what is originally provided in the value C. It is therefore possible that the adjustment of the pump displacement is positive or negative at start-up, to obtain the pressure Ptarget. Consequently, the correction that will follow will be positive or negative.

It is further possible to limit the displacement adjustments resulting from Vc or Vc' by giving them bounds. The bounds of the correction variable may be identical or distinct depending on whether the correction variable Vc (or Vc') has a positive or negative value.

It is furthermore possible to configure the controller 9 so as to generate error codes for the driver or for the maintenance agent if the bounds are reached. The fact of reaching a bound can indeed be the sign of an abnormal situation on the vehicle, for example the mounting of wheels of inappropriate dimension, or the fact of having a very deflated tire.

Between T1 and T2

At moment T1, the first axle 3 enters in slip condition. As can be seen in the graph 3B, the rotational speed of the wheels under slip condition therefore increases rapidly.

As previously, this situation causes an increase in the torque on the second axle 5. Firstly, the hydraulic pump 7 maintains a constant pressure Ptarget (graph 3D), while the correction variable Vc decreases until being completely "consumed" (graph 3C).

As understood from the above, the execution of the evaluation command has enabled to minimize the value of the correction variable Vc. The time required for this correction variable Vc to be reduced to zero and thus for the displacement of the hydraulic pump 7 to reach the value C+Cc' is therefore greatly reduced compared with the example represented in FIGS. 2A to 2D.

Between T2 and T3

The wheels of the first axle 3 are still under slip condition, and the rotational speed continues to increase (graph 3B). At moment T2, the displacement of the pump reaches the theoretical value C (graph 3C). The offset Vc is then completely consumed. The output pressure of the hydraulic pump 7 then increases (graph 3D) until reaching a threshold value at a moment T3.

Between T3 and T4

When the output pressure of the hydraulic pump 7 reaches the threshold value at a moment T3, the hydraulic assistance becomes fully effective, and then exerts a torque on the second axle 5 ensuring a driving of the vehicle, so as to control the rotational speed of the wheels of the first axle 3 (graph 3B). Unlike the example represented in FIGS. 2A to 2D, it is seen here that the displacement of the hydraulic pump 7 is very close to the ideal displacement value for perfect synchronization of the vehicle axles (graph 3C), the value of Vc having been minimized. The hydraulic assistance is thus provided with an optimal displacement.

From T4

At moment T4, the slip stops. The wheels of the first axle 3 recover their initial rotational speed (graph 3B), and the output pressure of the hydraulic pump 7 also returns to its initial value Ptarget (graph 3D). The displacement of the hydraulic pump 7 is changed to return to its value C+Cc'+Vc'.

Considering the piloting methods described with reference to FIGS. 2 and 3, it is thus understood that the proposed piloting method has several advantages compared to the conventional piloting methods.

Firstly, it is seen that the hydraulic assistance becomes effective more rapidly, due to the value Vc which is minimized. The time required for this variable Vc to be canceled is consequently greatly reduced. Indeed, it is clearly observed in FIGS. 2A to 2D and 3A to 3D that the time interval between the moments T1 and T2 is greatly reduced in FIGS. 3A to 3D with respect to FIGS. 2A to 2D.

In addition, the hydraulic assistance enters into operation with an optimal displacement, unlike a conventional piloting system in which the hydraulic assistance enters into operation with a degraded displacement value. It is indeed observed in FIGS. 3A to 3D that the hydraulic assistance enters into operation (between T3 and T4) with a displacement value close to the initial value, while in the case of FIGS. 2A to 2D, the displacement value of the hydraulic pump 7 when the hydraulic assistance is in operation is greatly reduced.

The effectiveness of the assistance is therefore increased both in terms of response time and of tractive force.

The value of the adjusted constant Ca when the latter is stored in a memory unit may also be used during maintenance operations of the vehicle. Indeed, it is understood that an adjusted constant Ca having a high value reflects a significant adjustment of the displacement, and therefore significant deviations relative to the theoretical behavior of the system. Conversely, an adjusted constant Ca having a low value reflects a system having an operation close to the theoretical model, and therefore having a priori an adaptation to the vehicle or to wear or more generally reduced defects.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. Consequently, the description and drawings should be considered in an illustrative rather than restrictive sense.

It is also obvious that all the characteristics described with reference to one method can be transposed, alone or in combination, to one device, and vice versa, all the characteristics described with reference to one device can be transposed, alone or in combination, to one method.

The invention claimed is:

1. A method for controlling a transmission device of a vehicle, the transmission device comprising a hydraulic transmission having n hydraulic motors driving wheels of the vehicle, n being a non-zero integer, and a hydraulic pump able to be driven by a drive to supply the n hydraulic motors with fluid, the method comprising:
    piloting a displacement of the hydraulic pump so that it delivers a constant flow rate to the n hydraulic motors that is proportional to a speed of the wheels driven in rotation by the drive,
    wherein the displacement piloting of the hydraulic pump is carried out by means of a correction constant and a correction variable such that the displacement of the hydraulic pump is equal to C+Cc+Vc, wherein C is a theoretical value based on a rotational speed of the main wheels, Cc is the correction constant, Vc is the correction variable,
    determining the correction variable in real time so as to compensate for an excess of a defect in displacement of the hydraulic pump,
    wherein the correction constant is composed of a sum of a theoretical constant and an adjusted constant, the theoretical constant is defined as a function of a theoretical behavior of the hydraulic transmission based on a theoretical model of the hydraulic transmission, and
    defining and correcting the adjusted constant when the vehicle is under predetermined conditions of use, in order to reflect the real state of the vehicle when it differs from a theoretical state used in the theoretical model of the hydraulic transmission.

2. The method according to claim 1, wherein said adjusted constant is stored in a memory unit, and is reevaluated upon execution of an evaluation command.

3. The method according to claim 2, wherein said evaluation command is executed each time the vehicle is put into operation.

4. The method according to claim 2, wherein during execution of the evaluation command, a value of the adjusted constant is changed to be equal to a percentage of a value of the correction variable, said percentage being between 80 and 95%.

5. The method according to claim 1, wherein the adjusted constant reflects the rolling circumference of each axle of the vehicle driven by one of the n hydraulic motors, variations in efficiency of different components of the hydraulic transmission, and mechanical elements of the vehicle.

6. The method according to claim 1, wherein the correction variable is less than or equal to a threshold value.

7. The method according to claim 6, wherein an error signal is emitted when the correction variable has a value greater than or equal to said threshold value.

8. A vehicle comprising a transmission device configured to be controlled according to the method of claim 1.

* * * * *